US007676121B2

(12) United States Patent
Gill et al.

(10) Patent No.: US 7,676,121 B2
(45) Date of Patent: Mar. 9, 2010

(54) THERMO-OPTIC TUNING OF A MULTI-DIRECTIONAL OPTICAL WAVEGUIDE

(75) Inventors: Douglas M. Gill, South Orange, NJ (US); Sanjay Patel, New Providence, NJ (US); Mahmoud Rasras, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 40 days.

(21) Appl. No.: 11/617,822

(22) Filed: Dec. 29, 2006

(65) Prior Publication Data

US 2008/0159681 A1 Jul. 3, 2008

(51) Int. Cl.
*G02F 1/295* (2006.01)
(52) U.S. Cl. .......................................................... 385/4
(58) Field of Classification Search ........................ None
See application file for complete search history.

(56) References Cited

U.S. PATENT DOCUMENTS

| 6,567,600 | B2* | 5/2003 | Yoshida ...................... 385/134 |
| 7,088,887 | B2* | 8/2006 | Ascanio et al. ............... 385/37 |
| 7,233,712 | B2* | 6/2007 | Arellano ...................... 385/14 |
| 2005/0018950 | A1* | 1/2005 | Arellano ...................... 385/14 |

* cited by examiner

*Primary Examiner*—Sung H Pak
(74) *Attorney, Agent, or Firm*—Hitt Gaines, PC

(57) ABSTRACT

Various embodiments provide an apparatus and a method for operating the apparatus. The apparatus, in one embodiment, may include an optical waveguide located over a substrate, the optical waveguide having a first segment and a second segment. The apparatus may further include a single heating element configured to heat both the first segment and the second segment, wherein a light propagation direction at a point in the second segment differs by at least 90 degrees with respect to a light propagation direction at the point in the first segment.

18 Claims, 5 Drawing Sheets

… (US 7,676,121 B2)

THERMO-OPTIC TUNING OF A MULTI-DIRECTIONAL OPTICAL WAVEGUIDE

U.S. GOVERNMENT

The U.S. Government has a paid-up license in this invention and the right in limited circumstances to require the patent owner to license others on reasonable terms as provided for by the terms of Contract No. HR0011-05-C-0027 awarded by DARPA under the Microsystems Technology Office.

TECHNICAL FIELD OF THE INVENTION

The present invention is directed, in general, to thermo-optic heating and, more specifically, to the thermo-optic heating of a multi-directional optical waveguide.

BACKGROUND OF THE INVENTION

Thermo-optic phase-shifting devices (e.g., thermo-optic heaters) are essential components of optical communication systems. By thermally changing the refractive index of material in an optical pathway, they can control switching, attenuation or modulation of an optical signal. The principle of operation is that by heating a waveguide, the lightwave in the waveguide can be delayed enough to control switching, attenuation or modulation thereof.

A typical thermo-optic phase shifter comprises a resistance heater thermally coupled to the high index core of a silica, or silicon, waveguide. Heat changes the temperature of the core, and thereby the refractive index since it is temperature dependent. This changes the optical refractive index and distance (optical pathlength) and hence changes the time required for the passage of the light.

SUMMARY OF THE INVENTION

Typical thermo-optic phase shifters are collinear with the optical waveguides, wherein one substantially straight optical waveguide is heated by a single heater. While such phase shifters are simple to fabricate and operate, they tend to consume too much power and dissipate too much heat for many applications, as well as are limited in the materials that may be used because of the very specific range of resistivity that may be required. To address this deficiency, one embodiment provides an apparatus and another embodiment provides a method for operating the apparatus.

In one embodiment the apparatus may include an optical waveguide located over a substrate, the optical waveguide having a first segment and a second segment. The apparatus may further include a single heating element configured to heat both the first segment and the second segment, wherein a light propagation direction at a point in the second segment differs by at least 90 degrees with respect to a light propagation direction at a point in the first segment.

In one embodiment, the method (e.g., without limitation) may include applying a voltage across a region of a heating element located proximate a first segment and a second segment of an optical waveguide to heat the first and second segments, wherein a light propagation direction in the second segment differs by at least 90 degrees with respect to a light propagation direction in the first segment.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

Various embodiments are based, at least in part, on the recognition that a single segment of a thermo-optic heater may be used to heat multiple segments of an optical waveguide, all the while consuming less power per unit length of optical waveguide than traditional devices. For instance, the present inventors recognize that a single heating element can be configured to heat at least first and second segments of an optical waveguide. Accordingly, a light propagation direction at a point in the second segment differs by at least about 90 degrees with respect to a light propagation direction at a point in the first segment. In one embodiment, the angles of propagation are measured with respect to the direction of the current flow in the heating element. By heating the aforementioned first and second segments using a single heater, power consumption is reduced because the thermo-optic heater surface area per unit length of optical waveguide may be reduced. Moreover, higher resistivity thermo-optic heater materials, which were previously not compatible with traditional thermo-optic heaters, may now be used. This is particularly advantageous for developing process flows compatible with restrictive manufacturing platforms (e.g., silicon complementary metal oxide semiconductor (CMOS) devices).

Figure 1:
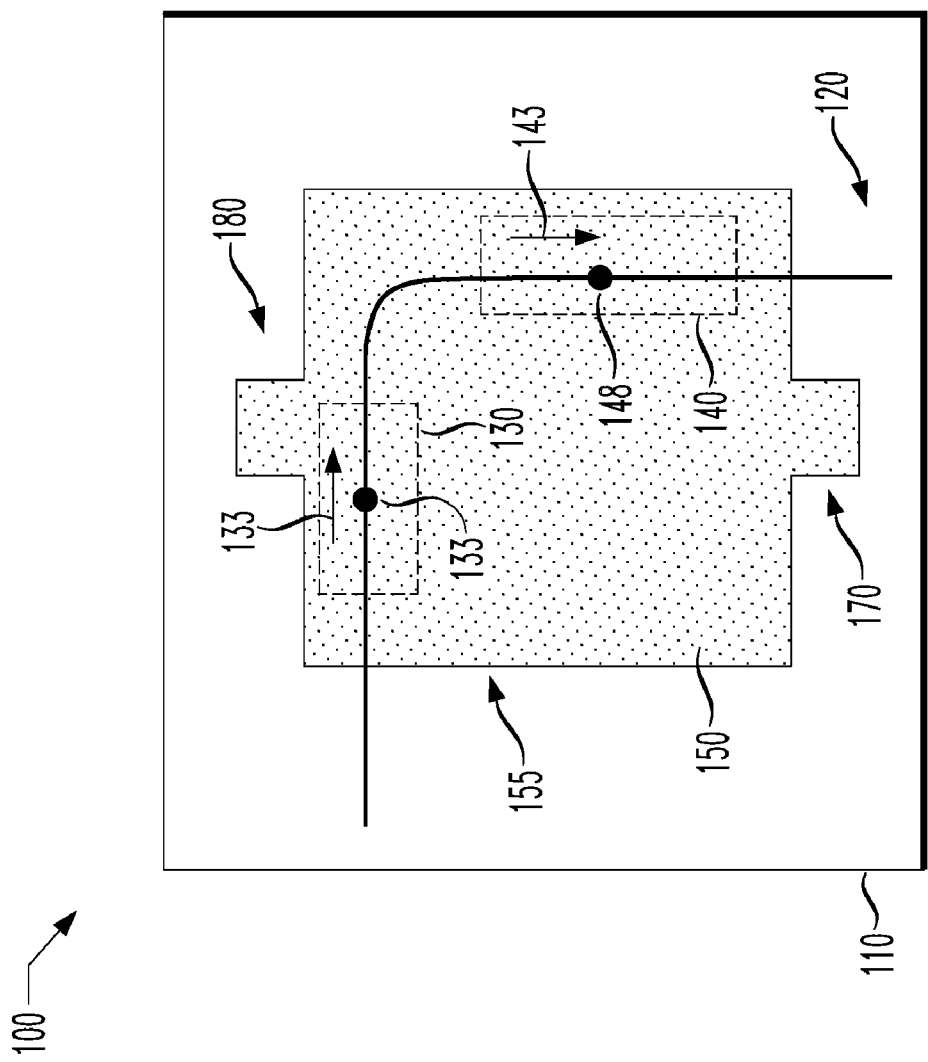
FIG. 1 illustrates a plan view of one embodiment of an apparatus.

Turning now to FIG. 1, illustrated is a plan view of one embodiment of an apparatus 100. The apparatus 100 may take on many different configurations. Nevertheless, in the embodiment of FIG. 1 the apparatus is configured as a thermo-optic heater. In this embodiment, the thermo-optic heater might be used to switch, attenuate or modulate an optical signal passing therethrough.

The apparatus 100 of FIG. 1 initially includes a substrate 110. The substrate 110 may comprise many different materials and remain within the embodiment. For example, the substrate 110 may comprise many different materials compatible with CMOS devices, for instance silicon in one embodiment. In other embodiments, however, the substrate 110 may comprise other non-semiconductor based materials, such as lithium niobate.

Positioned over the substrate 110 is an optical waveguide 120. Those skilled in the art understand the many different types of optical waveguides that might be used in an apparatus such as the illustrated apparatus 100, including planar optical waveguides, ridge-shaped optical waveguides and channel waveguides, to name a few. In one embodiment, however, the optical waveguide 120 includes a ridge-shaped optical core, for example comprising silicon (e.g., a semiconductor material), surrounded by optical cladding layers, for example comprising silicon dioxide. The ridge-shaped optical core, in this embodiment functions as the optical path for the photons to travel, wherein the optical cladding layers assist in confining the photons to the ridge-shaped or channel-shaped core.

The optical waveguide 120 being heated by the heating element 150, as opposed to traditional structures, comprises a unique shape. For instance, at least a portion of the optical waveguide 120 configured to be heated by the heating element 150, might be U shaped. Alternatively, at least a portion of the optical waveguide 120 configured to be heated by the heating element 150, might take on a serpentine shape, a circinate shape, or a Hilbert curve shape, among others. Each of the above-mentioned shapes, as well as other shapes, might be used in a specific instance for a specific purpose. For example, a more detailed shape might be used wherein greater heating is desired, and a less detailed shape might be used wherein lesser heater is desired.

In essence, the optical waveguide 120 may be configured in any known or hereafter discovered shape, as long as it continues to properly function as a waveguide. Accordingly, the optical waveguide should not be turned in such a sharp radius that it fails to properly guide the light. Currently, an optical waveguide may have a turning radius down to about 5 microns and still properly guide the optical signal.

Regardless of the shape of the optical waveguide 120, it should include at least a first segment 130 and a second segment 140 heated by the heating element 150. In this embodiment, a light propagation direction 143 at a point 148 in the second segment 140 differs by at least 90 degrees with respect to a light propagation direction 133 at a point 138 in the first segment 130. Light propagation direction, as used herein, means the direction that a photon of light particle would be traveling through the optical waveguide 120 at a given point therein, were the optical waveguide 120 to be coupled to an optical light source. It should be noted, however, that the optical waveguide 120, and more specifically points along the optical waveguide 120, would have a light propagation direction irrespective of the optical waveguide 120 being coupled to the optical light source and having photons of light passing there through.

As previously indicated, the apparatus 100 illustrated in FIG. 1 includes the heating element 150 configured to heat both the first segment 130 and the second segment 140. The first segment 130 and the second segment 140, in the illustrated embodiment, are located within a footprint 155 formed by a perimeter of the heating element 150. In another embodiment, however, the first segment 130 and the second segment 140 are only partially located within the footprint 155.

The heating element 150, in the embodiment of FIG. 1, happens to be located over the optical waveguide 120 and more particularly over the first segment 130 and second segment 140. Accordingly, the first segment 130 and the second segment 140 interpose the heating element 150 and the substrate 110. In another embodiment, however, the optical waveguide 120, and more particularly the first segment 130 and the second segment 140 thereof, could be located over the heating element 150. Accordingly, in this embodiment the heating element 150 would interpose the substrate 110 and the first segment 130 and the substrate 110 and the second segment 140.

The heating element 150 may comprise various different materials. In many applications, the material that the heating element 150 comprises would be tailored to the specific application. For instance, wherein a higher resistance is needed a more resistive material might be chosen, and wherein a lower resistance is needed a less resistive material might be chosen. Without limitation, the higher resistance materials might include a thin metal, titanium silicide, or cobalt silicide, and the lower resistance materials might include chromium, aluminum, etc. Nevertheless, in the embodiment of FIG. 1, the heating element 150 comprises a metal silicide layer, and more particularly cobalt silicide. Those skilled in the art understand the processes that might be used to manufacture the heating element 150, thus no further detail is given.

An apparatus, such as the apparatus 100 of FIG. 1, might be operated by applying a voltage across a first region 170 and a second region 180 of the heating element 150. In doing so, the resistive nature of the material comprising the heating element 150 would cause it to heat up, and thereby transfer at least a portion of its heat to the optical waveguide 120 located thereby. Because the first segment 130 and the second segment 140 of the optical waveguide 120 are being heated by the heating element 150, superior heating may be achieved. A heating controller, such as the one shown, might be used to control the heating element 150. Likewise, the heating element 150 might have a heating current input and output, as shown.

Figure 2:
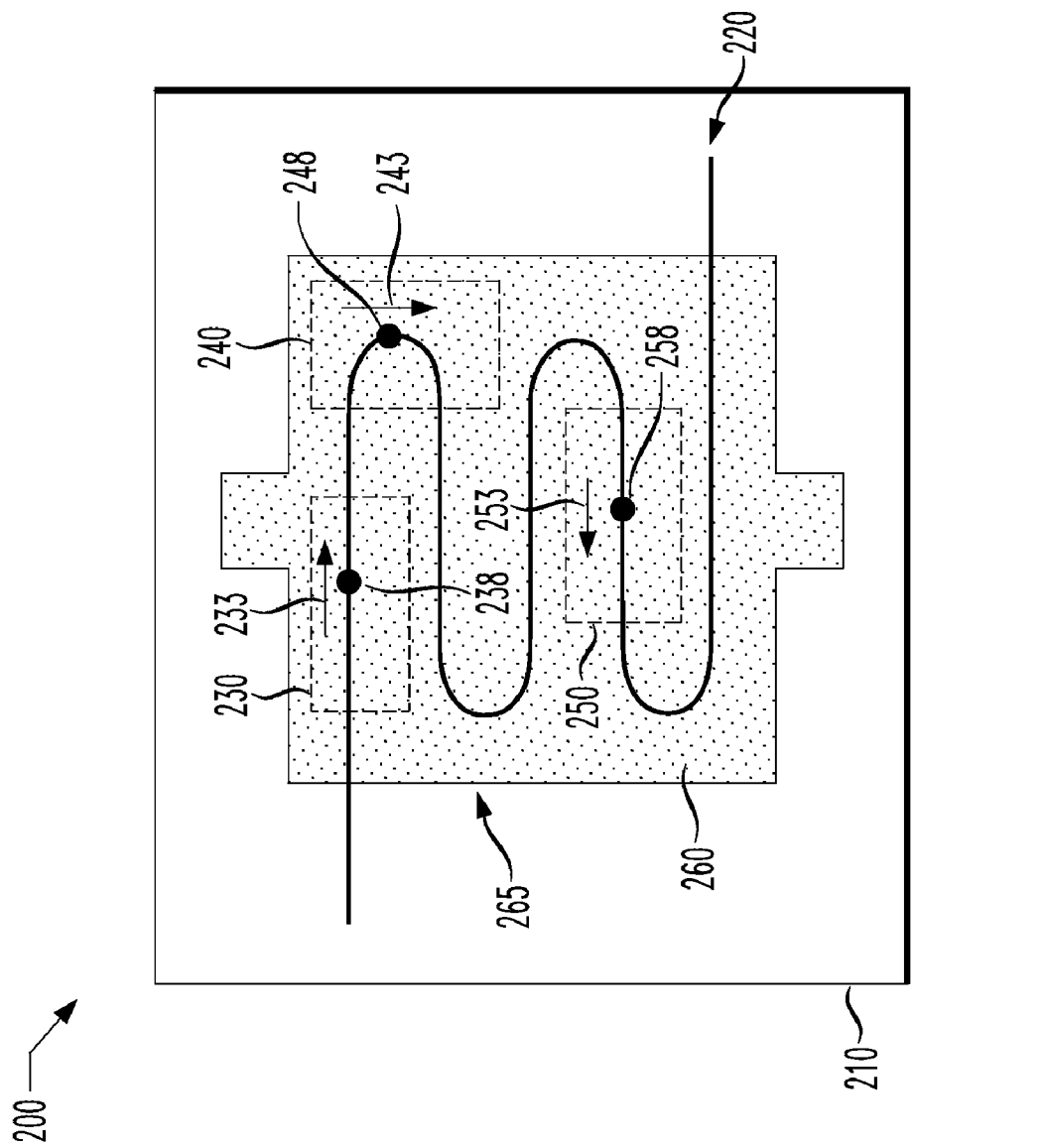
FIG. 2 illustrates an alternative embodiment of an apparatus.

Turning briefly to FIG. 2, illustrated is an alternative embodiment of an apparatus 200. The apparatus 200 includes a substrate 210, which may be substantially similar to the substrate 110 of FIG. 1, having an optical waveguide 220 located thereover. The optical waveguide 220, as opposed to the L-shape of the optical waveguide 120 of FIG. 1, is serpentine shaped.

Accordingly, in the embodiment of FIG. 2 the optical waveguide 220 includes at least a first segment 230, a second segment 240 and a third segment 250 heated by a heating element 260. In this embodiment, a light propagation direction 243 at a point 248 in the second segment 240 differs by at least 90 degrees with respect to a light propagation direction 233 at a point 238 in the first segment 230, as well as a light propagation direction 253 at a point 258 in the third segment 250 differs by at least 180 degrees with respect to the light propagation direction 233 at the point 238 in the first segment 230. As is illustrated, the first segment 230, second segment 240 and third segment 250 are located within a footprint 265 formed by a perimeter of the heating element 260.

Figure 3:
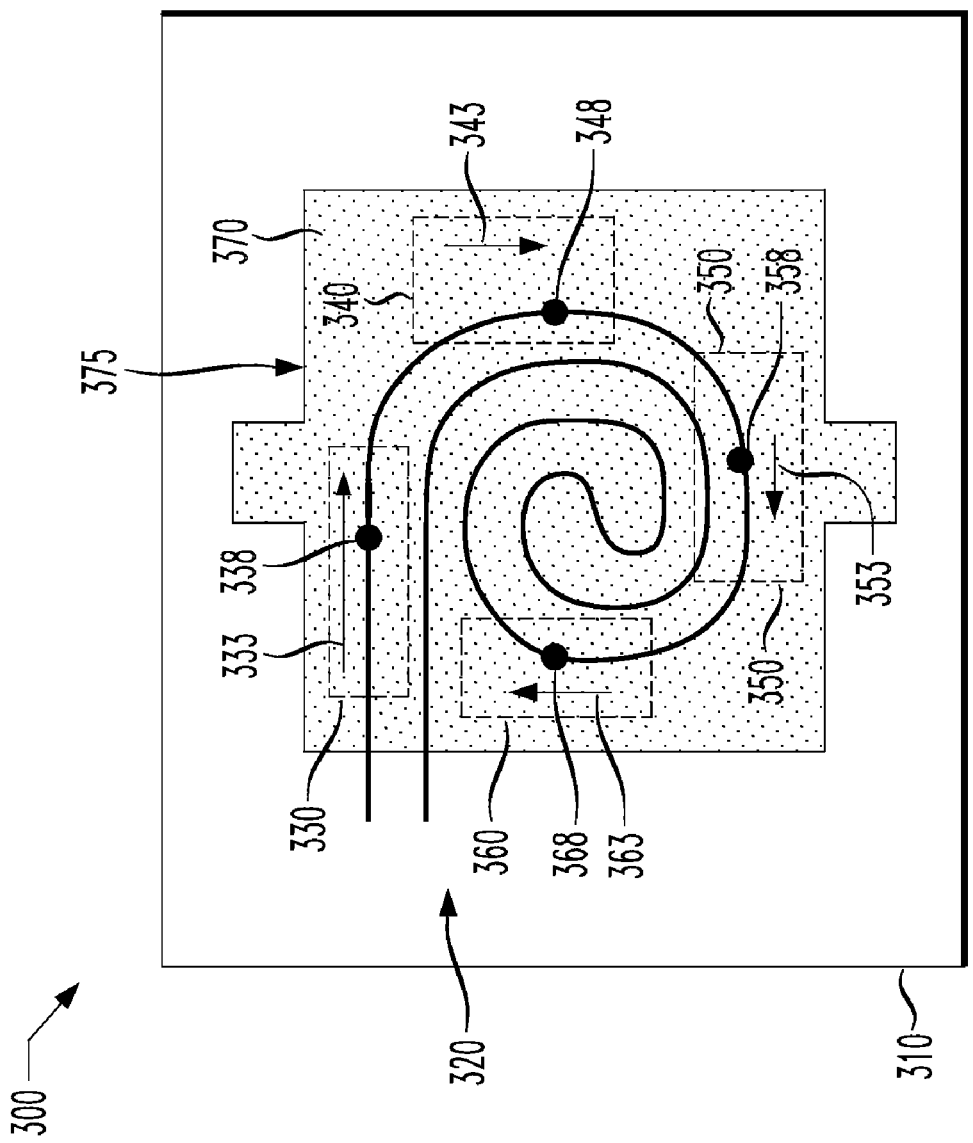
FIG. 3 illustrates yet another embodiment of an apparatus.

Turning briefly now to FIG. 3, illustrated is yet another embodiment of an apparatus 300. The apparatus 300 includes a substrate 310, which may be substantially similar to the substrates 110, 210 of FIGS. 1 and 2, respectively, having an optical waveguide 320 located thereover. The optical waveguide 320, as opposed to the L-shape of the optical waveguide 120 of FIG. 1 and the serpentine shaped optical waveguide 220 of FIG. 2, is circinate shaped.

Accordingly, in the embodiment of FIG. 3 the optical waveguide 320 includes at least a first segment 330, a second segment 340, a third segment 350 and a fourth segment 360 heated by a heating element 370. In this embodiment, a light propagation direction 343 at a point 348 in the second segment 340 differs by at least 90 degrees with respect to a light propagation direction 333 at a point 338 in the first segment 330, as well as a light propagation direction 353 at a point 358 in the third segment 350 differs by at least 180 degrees with respect to the light propagation direction 333 at the point 338 in the first segment 330, and further wherein a light propagation direction 363 at a point 368 in the fourth segment 360 differs by at least 270 degrees with respect to the light propagation direction 333 at the point 338 in the first segment 330. As is illustrated, the first segment 330, second segment 340, third segment 350, and fourth segment 360 are located within a footprint 375 formed by a perimeter of the heating element 370.

Figure 4:
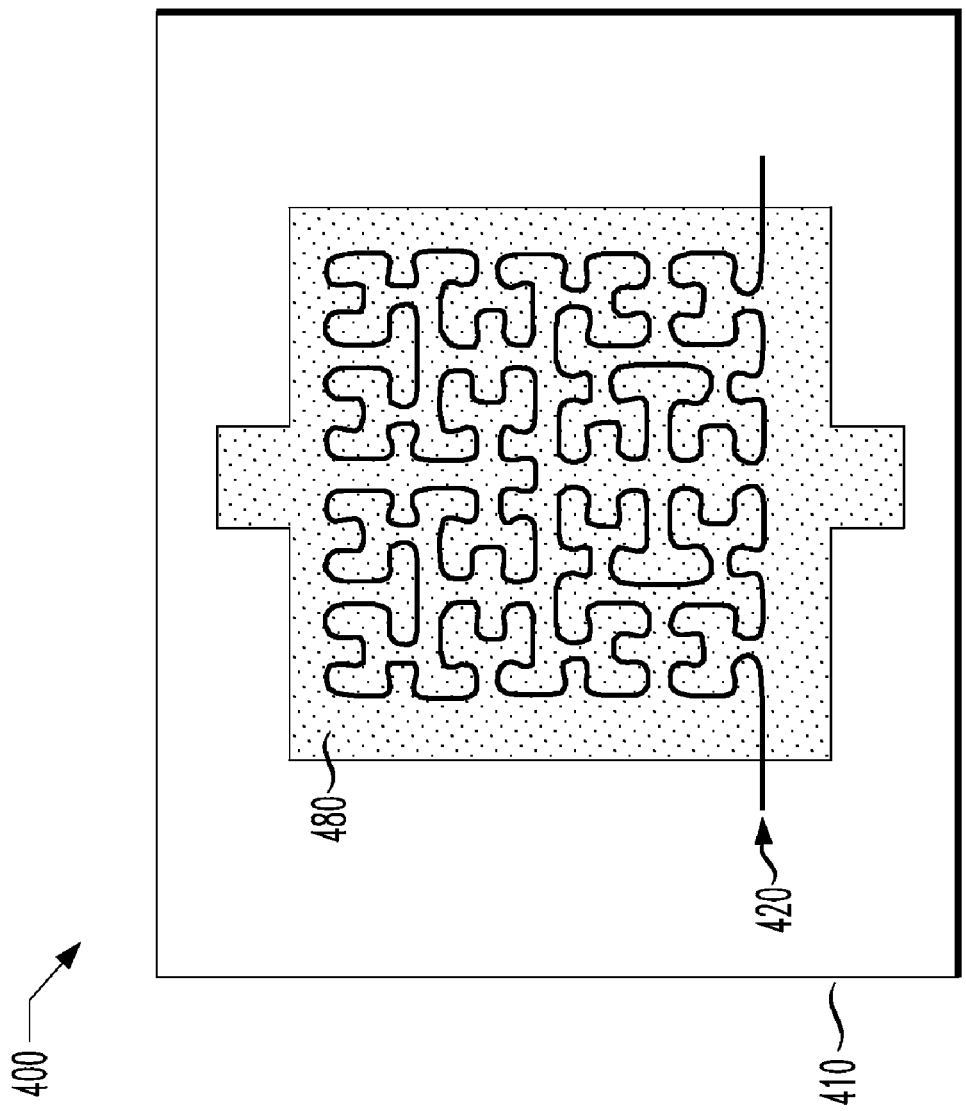
FIG. 4 illustrates another embodiment of an apparatus.

Turning briefly now to FIG. 4, illustrated is yet another embodiment of an apparatus 400. The apparatus 400 includes a substrate 410, which may be substantially similar to the substrates 110, 210, 310 of FIGS. 1 thru 3, having an optical waveguide 420 located thereover. The optical waveguide 420, as opposed to the L-shape of the optical waveguide 120 of FIG. 1, the serpentine shaped optical waveguide 220 of FIG. 2, and the circinate shaped optical waveguide 320 of FIG. 3, takes on a very different shape. In this instance, the shape of the optical waveguide 420 is configured to maximize the amount of heat per unit area transferred from the heating apparatus 480 to the optical waveguide 420. Accordingly, in one instance the optical waveguide 420 is configured as a Hilbert curve shape. Nevertheless, other shapes could be used to maximize the aforementioned heat.

The present embodiment, as opposed to traditional structures, generally has a higher ratio of a unit length (microns) of the optical waveguide to an area (microns squared) of a footprint of the heating element. For instance, in certain embodiments the ratio may be at least 0.1. Nevertheless, in certain other embodiments the ratio may be even larger, and thus be at least 0.3. This is as compared to traditional designs, wherein the ratio would be expected to be on the order of only 0.05.

Figure 5:
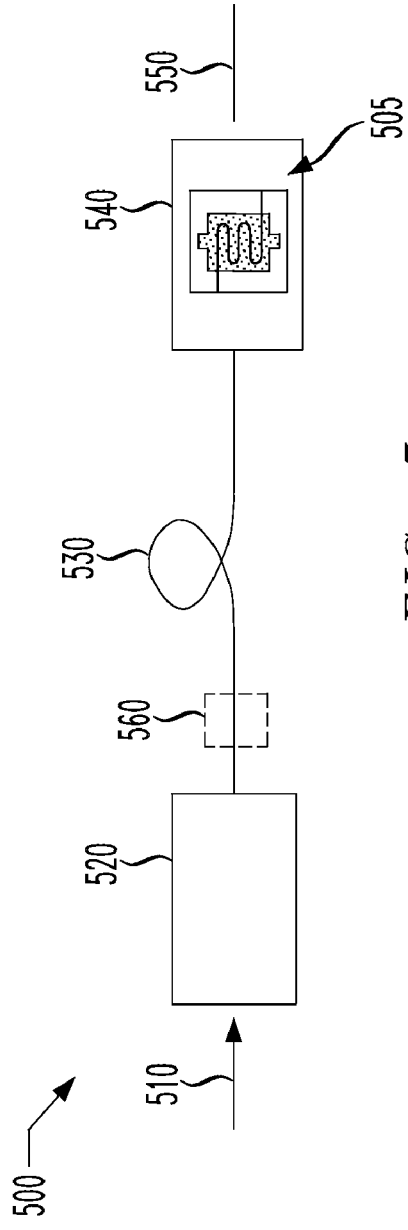
FIG. 5 illustrates a plan view of an optical communications system, which may form one environment in which an apparatus (e.g., the apparatus of FIGS. 1 thru 5) may be used.

Turning now to FIG. 5, illustrated is a plan view of an optical communications system 500, which may form one environment in which an apparatus 505 (e.g., similar to one of the apparatus 100, 200, 300, 400) may be used. An initial signal 510 enters a transceiver 520 of the optical communications system 500. The transceiver 520, receives the initial signal 510, addresses the signal 510 and sends the resulting information across an optical fiber 530 to a transceiver 540. The transceiver 540 receives the information from the optical fiber 530, addresses the information, and sends an output signal 550. As illustrated in FIG. 5, the apparatus 505 may be included within the transceiver 540. The apparatus 505 may also be included anywhere in the optical communications system 500, including the transceiver 520. It should be noted that the optical communications system 500 is not limited to the devices previously mentioned. For example, the optical communications system 500 may include an element 560, such as a laser, diode, modulator, optical amplifier, optical waveguide, photodetectors, or other similar device, which may also include the apparatus 505.

Figure 6:
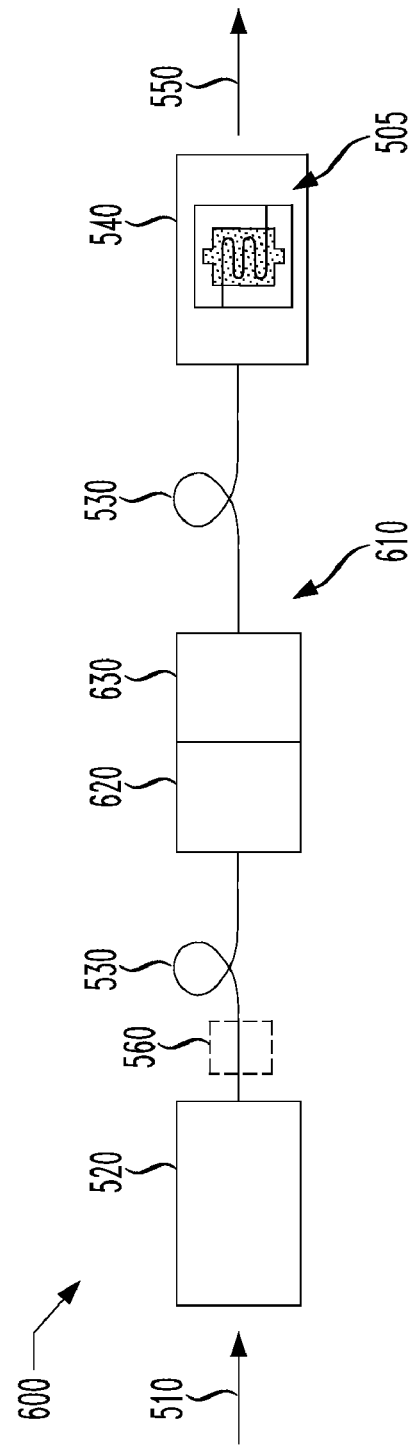
FIG. 6 illustrates an alternative optical communications system.

Turning briefly to FIG. 6, illustrated is an alternative optical communications system 600, having a repeater 610, including a second receiver 620 and a second transmitter 630 (e.g., collectively a transceiver), located between the transceiver 520 and the transceiver 540. As illustrated, the alternative optical communications system 600 may also include the apparatus 505.

Although the present invention has been described in detail, those skilled in the art should understand that they can make various changes, substitutions and alterations herein without departing from the spirit and scope of the invention.

What is claimed is:

1. An apparatus, comprising:
    an integrated optical waveguide located over a substrate, the optical waveguide having a first segment and a second segment;
    a heating element configured to increase a temperature of both the first segment and the second segment, and
    wherein a light propagation direction at a point in the second segment differs by at least 90 degrees with respect to a light propagation direction at a point in the first segment, and further wherein a ratio of a unit length (microns) of the integrated optical waveguide heated by the heating element to an area (microns squared) of a footprint of the heating element is at least about 0.1.

2. The apparatus as recited in claim 1 wherein the integrated optical waveguide is a planar optical waveguide.

3. The apparatus as recited in claim 1 wherein the light propagation direction at the point in the second segment differs by about 180 degrees with respect to the light propagation direction at the point in the first segment.

4. The apparatus as recited in claim 1 wherein the integrated optical waveguide has a third segment and a fourth segment, the heating element configured to increase a temperature of the third segment and fourth segment, and wherein the light propagation direction at the point in the second segment differs by about 90 degrees with respect to the light propagation direction at the point in the first segment, a light propagation direction at a point in the third segment differs by about 180 degrees with respect to the light propagation direction at the point in the first segment, and a light propagation direction at a point in the fourth segment differs by about 270 degrees with respect to the light propagation direction of the point in the first segment.

5. The apparatus as recited in claim 4 wherein a shape of at least a portion of the integrated optical waveguide configured to be heated by the heating element is selected from the group consisting of:
    a U shape;
    a serpentine shape;
    a circinate shape; and
    a Hilbert curve shape.

6. The apparatus as recited in claim 1 wherein the first and second segments are located within a footprint formed by a perimeter of the heating element.

7. The apparatus as recited in claim 1 wherein the first segment and the second segment interpose the heating element and the substrate.

8. The apparatus as recited in claim 1 wherein the heating element interposes the first segment and the substrate and the second segment and the substrate.

9. The apparatus as recited in claim 1, further including an optical fiber coupled to the integrated optical waveguide, wherein the integrated optical waveguide and the optical fiber form at least a portion of an optical communications system.

10. A method for operating an integrated optical waveguide, comprising:
    applying a voltage across a region of a heating element located proximate a first segment and a second segment of an integrated optical waveguide to increase a temperature of the first and second segments, wherein a ratio of a unit length (microns) of the integrated optical waveguide heated by the heating element to an area (microns squared) of a footprint of the heating element is at least about 0.1; and
    wherein a light propagation direction at a point in the second segment differs by at least 90 degrees with respect to a light propagation direction at a point in the first segment.

11. The method as recited in claim 10 wherein the integrated optical waveguide is a planar optical waveguide.

12. The method as recited in claim 10 wherein the light propagation direction at the point in the second segment differs by about 180 degrees with respect to the light propagation direction at the point in the first segment.

13. The method as recited in claim 10 wherein the integrated optical waveguide has a third segment and a fourth segment heated by the heating element, and wherein the light propagation direction at the point in the second segment differs by about 90 degrees with respect to the light propagation direction at the point in the first segment, a light propagation direction at a point in the third segment differs by about 180 degrees with respect to the light propagation direction at the point in the first segment, and a light propagation direction at a point in the fourth segment differs by about 270 degrees with respect to the light propagation direction at the point in the first segment.

14. The method as recited in claim 13 wherein a shape of at least a portion of the integrated optical waveguide heated by the heating element is selected from the group consisting of:
- a U shape;
- a serpentine shape;
- a circinate shape; and
- a Hubert curve shape.

15. The method as recited in claim 10 wherein the first and second segments are located within a footprint formed by a perimeter of the heating element.

16. The method as recited in claim 10 wherein the first segment and the second segment interpose the heating element and the substrate.

17. The method as recited in claim 10 wherein the heating element interposes the first segment and the substrate and the second segment and the substrate.

18. The method as recited in claim 10, further including an optical fiber coupled to the integrated optical waveguide, wherein the integrated optical waveguide and the optical fiber form at least a portion of an optical communications system.

* * * * *